United States Patent [19]
Reeves et al.

[11] 3,736,468
[45] May 29, 1973

[54] GROUND FAULT INTERRUPTER APPARATUS

[75] Inventors: John R. Reeves, Trafford; George F. Bogel, Pittsburgh; Francis T. Thompson, Murrysville, all of Pa.

[73] Assignee: Westinghouse Electric Corporation, Pittsburgh, Pa.

[22] Filed: June 30, 1971

[21] Appl. No.: 158,338

[52] U.S. Cl............317/18 D, 317/27 R, 317/33 SC
[51] Int. Cl.............................................H02h 3/28
[58] Field of Search..................317/18 D, 27 R, 131, 317/33 SC

[56] References Cited
UNITED STATES PATENTS

| | | | |
|---|---|---|---|
| 3,117,253 | 1/1964 | Antoszewski | 317/131 |
| 3,555,359 | 1/1971 | Morris et al. | 317/18 D |
| 3,597,656 | 8/1971 | Douglas | 317/18 D |
| 3,493,815 | 2/1970 | Hurtle | 317/18 D |

OTHER PUBLICATIONS

Bentel, C. A., "Preliminary Residential Branch Circuit Differential Current, Capacitance And Resistance Measurements," 1/30/67, pp. 1–8.

*Primary Examiner*—James D. Trammell
*Attorney*—A. T. Stratton, F. P. Lyle and Gordon H. Telfer

[57] ABSTRACT

A differential transformer for sensing the fault current in a ground fault interrupter includes a magnet toroid with the power leads extending through it in a co-axial arrangement to provide single turn primary conductors. Stray current resulting from uneven placement of the power conductors within the toroid is thereby avoided; the relation of each of the coaxial conductors to the toroid is the same. Single turn coaxial conductors are highly advantageous in providing a miniaturized differential transformer with which there may be employed new miniature trip circuits of solid state components providing good noise immunity, high input impedance, inverse time delay and temperature compensation.

4 Claims, 5 Drawing Figures

GROUND FAULT INTERRUPTER APPARATUS

BACKGROUND OF THE INVENTION

1. Field of the Invention

This invention relates to ground fault interrupter apparatus of the differential transformer type.

2. Description of the Prior Art

Ground fault interrupters are a generally known type of apparatus wherein a differential transformer is used to sense a ground fault current and develop a signal to open the circuit upon reaching a predetermined value. A number of such devices have been disclosed in the literature, such as in an article in IEEE Spectrum, Jan. 1970, pages 55 to 62, and in U.S. Pat. No. 3,213,321, Oct. 19, 1965.

The prior art, such as the above-mentioned, discloses ground fault interrupters wherein the trip signal for opening the circuit is developed from the sensing coil by means of an electronic circuit of solid state components. The power conductors pass singly on spaced centers straight through the transformer core which is a form preferred for simplicity of construction and which can be functionally suitable if the trip circuit is adequately sensitive. Such apparatus has been shown to have a general capability for ground fault interruption, yet there have been problems associated with the fact that the output of the sensing coil on the transformer, intended to be a voltage proportional to the fault current, is subject to undesired variations caused by changes in the load on the circuit, the temperature at which the device is operated, and the position of the load conductors within the transformer core.

It is also known in the art of differential current to use multi-turn primary conductors arranged on a single axis (coaxial) to achieve close magnetic linkage and good flux cancellation. For example, such a differential transformer is disclosed for test equipment to measure differential currents on residential circuits in normal operation in a report entitled "Preliminary Residential Branch Circuit Differential Current, Capacitance and Resistance Measurements," by C. A. Bentel, dated Jan. 30, 1967 and May 31, 1967, Subject 943, STP 66M209, and distributed by Underwriters' Laboratories, Inc., Melville, New York. In the latter document, differential transformers with coaxial primaries wound in four turns are disclosed.

SUMMARY OF THE INVENTION

The present invention is directed to differential transformers and trip circuits, particularly for ground fault interrupters, that provide simplicity of structure in compact form, low stray fluxes, high sensitivity tripping with immunity to electrical noise, and compensation for variations in temperature and line voltage.

Trip circuits in accordance with this invention generally comprise transistor amplifier means to amplify the voltage developed by the sensing coil of a differential transformer and to provide a tripping signal to the trip coil of a circuit breaker by a solid state switching device firing circuit that has incorporated with it noise immunity means. If desired, a circuit can be provided that senses both half cycles of the sensed voltage to provide a trip signal in the shortest possible time upon the occurrence of a ground fault. Temperature compensating resistors can be used in the sensing circuit so that the component characteristics remain the same within a normal range of temperature variation.

The trip circuits permit miniaturization and, because of their good electrical characteristics, make it practical to use signal turn, coaxial primary conductors.

DESCRIPTION OF PREFERRED EMBODIMENTS

A premise on which ground fault interrupters of the differential transformer type is based is that the secondary (sensing coil or winding) of the transformer indicates a sensing voltage proportional to the difference between the currents on the load conductors. When such currents are equal, equal and opposite fluxes are produced cancelling the sensed voltage.

Figure 1:
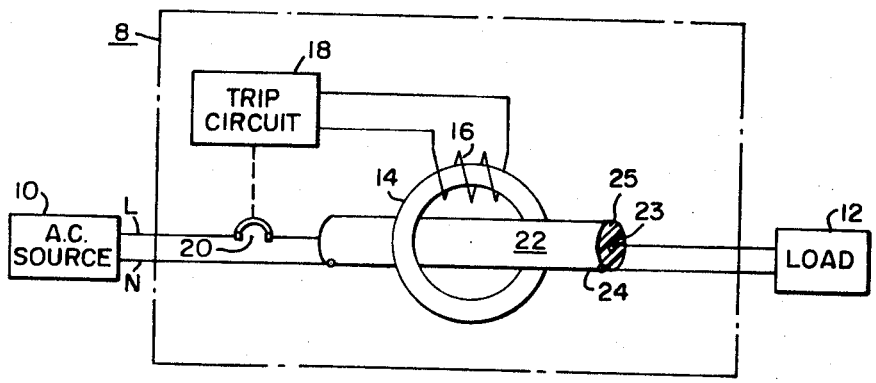
FIG. 1 is a general circuit schematic of a ground fault interrupter between an A.C. supply and a load circuit in which load conductors are provided in single turn, coaxial form in accordance with this invention as they pass through the toroid of the differential transformer.

FIG. 1 shows a general arrangement of ground fault interrupter apparatus 8 associated with load conductors, indicated as L for the line conductor and N for the neutral conductor, between an alternating source 10 and a load 12. Apparatus 8 is provided with a magnetic toroid 14 encircling the conductors L and N so that each conductor acts as a primary of one turn on the toroid 14. The number of conductors may be two or more. The illustration shows a single phase, two wire system although the principle is the same with AC systems of other numbers of conductors.

A pickup or sensing coil 16 on the toroid 14 senses the apparent difference between line and neutral current. The sensing winding 16 produces an output voltage that is proportional to the indicated fault current. This voltage is used to operate a trip circuit 18, connected with the sensing winding 16, that trips a breaker or relay 20 on the line L if the sensed signal is above a certain level. When the primary conductors through the toroid are laterally spaced from each other, appreciable variations in the sensed signal may occur in the absence of a fault. This means that to the extent the load conductors L and N are not each positioned in the same relation to the toroid 14, there is a sensed signal. This signal, due to an apparent net flux, sometimes referred to as stray flux, can be appreciable, particularly at high load currents.

In the embodiment of FIG. 1 the problem of properly positioning the conductors L and N is greatly minimized by the fact that the conductors L and N, at least over the portion thereof passing through the toroid 16, are in the form of a coaxial cable 22. That is, the two or more power conductors are arranged on a common axis so that they maintain a uniform relationship to the toroid even if not on the toroid axis or if subject to movement during use. In the event of any movement of the coaxial conductors the net flux produced remains near zero in the absence of a ground fault.

The problems of differences in position of the load conductors are particularly aggravated by miniaturization of the transformer. The interest in miniaturization is of course to permit the ground fault interrupter to be provided in as small a unit as possible for convenience and economy. The most bulky element in the differential transformer is the toroid 14. If the toroid can be made with an inner aperture that is large relative to the dimensions of the load conductors, then it can be seen that small movements of the conductors would have only a slight effect on their relation with the toroid. However, in order to provide a more compact apparatus, the toroid 14 is reduced to minimum size. This creates a situation where relatively small differences in location of the load conductors can produce appreciable stray fluxes. Consequently, while the feature of providing the power conductors in coaxial form is useful in any differential transformer with single turn primaries of two or more conductors, it is particularly advantageous and important in small differential transformers such as where the toroid aperture is within an order of magnitude of the combined diameters of the power conductors.

The coaxial conductor 22 may comprise a centrally located single wire conductor 23 and a concentric cylindrical outer conductor 24 maintained in fixed spaced relation to the inner conductor by an insulation medium 25. In a system with a number of conductors greater than two, the third conductor would be a concentric member around and spaced from the conductor 23 and so forth. The principle of using a coaxial arrangement of conductors is not affected by which conductor, L or N, is the inner conductor 23 and which conductor is the outer conductor 24.

The exact form of the coaxial conductors may be selected from various known types. A preferred specific coaxial conductor and its arrangement in the differential transformer of a ground fault interrupter is disclosed in copending application, Ser. No. 158,336, filed June 30, 1971, by J. J. Misencik and assigned to the present assignee.

The foregoing features therefore provide means to insure that the sensed voltage is constant for a given fault current regardless of load current variations or variations in the position of the toroid relative to the power conductors.

Figure 2:
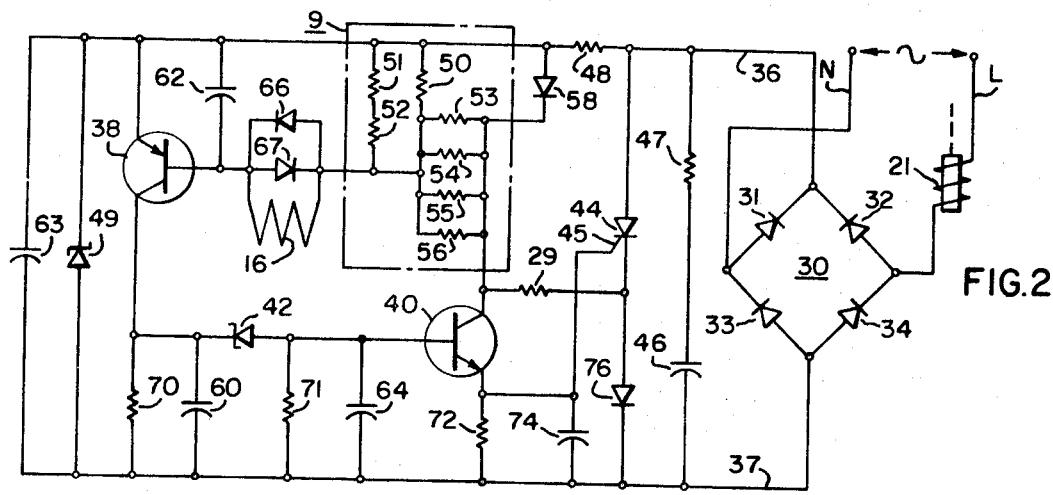
FIGS. 2, 3, and 4 are circuit schematics of trip circuits for ground fault interrupters in accordance with this invention.
Figure 3:
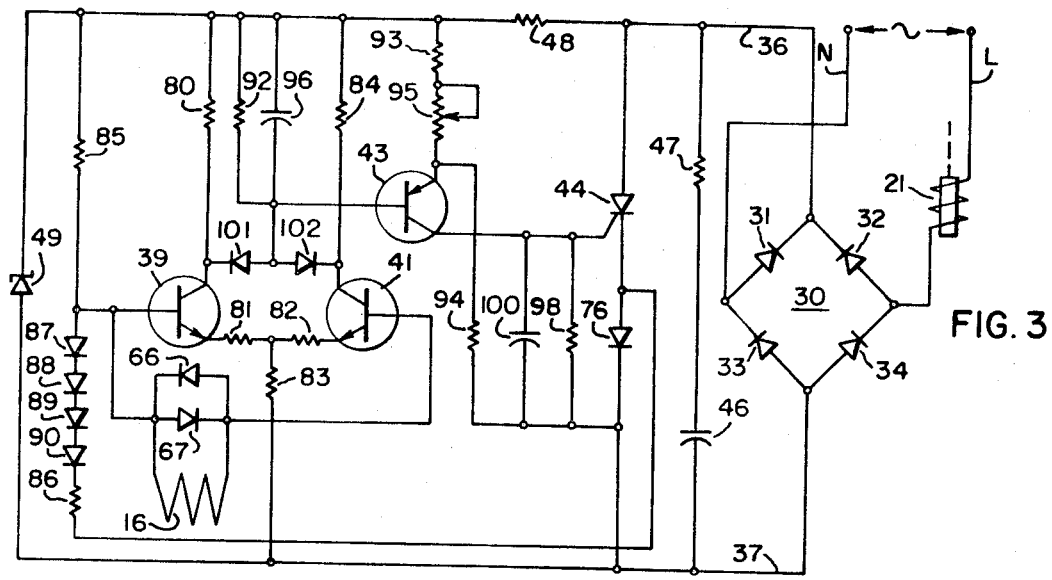
Figure 4:
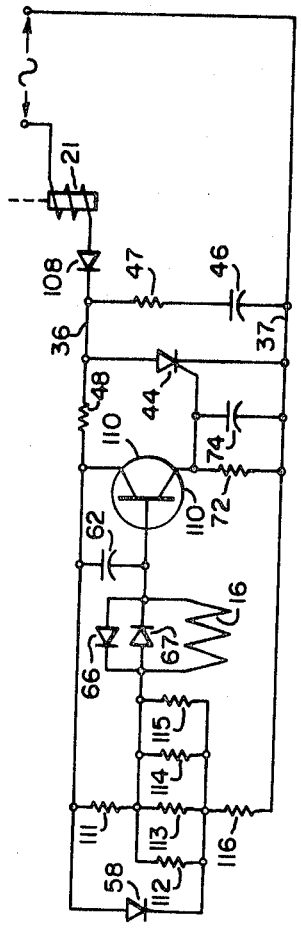

Reference is now made to FIGS. 2, 3 and 4 which are circuits useful in the system of FIG. 1 as the trip circuit 18. The circuits of FIGS. 2, 3 and 4 may be used in ground fault interrupters of the differential transformer type regardless of the specific arrangement of conductors on or in the transformer toroid, but these circuits make it practical to use a miniature differential transformer with a single turn, coaxial primary because of their combined qualities of high sensitivity and good noise immunity as well as other advantageous characteristics.

FIG. 2 shows a circuit in accordance with this invention wherein a trip coil 21 for a circuit breaker is connected to one load conductor L and one corner of a rectifier bridge 30, the opposite corner of which is connected to the other conductor N. The rectifier bridge 30 has diodes 31, 32, 33 and 34 for full wave rectification to develop a DC voltage level on lines 36 and 37 for powering the trip circuit.

A transistor 38 (PNP in this example) is connected with its emitter-collector path across the DC conductors 36 and 37 and has its base input biased by a network 9 of biasing impedances, to be subsequently described. The voltage developed by the sensing coil 16 of the differentail transformer produces a current signal applied to the base of transistor 38. If transistor 38 is turned on by the sensed signal, the signal is amplified and applied to the base circuit of a second transistor 40 (NPN in this example) which is turned on only after a zener diode or other voltage limiting means 42 in the base circuit breaks down. When the emitter of transistor 40 rises sufficiently in voltage due to the magnitude of the signal at its base, it will apply a signal to the gate of thyristor 44 sufficient to turn on the latter. Conduction of thyristor 44 will present a low impedance between DC lines 36 and 37 that will actuate the trip coil 21.

A capacitor 46, connected across the DC lines in series with a resistor 47, serves to smooth the DC power on the lines 36 and 37. The large DC voltage from bridge 30 developed from 120 volts, A.C., is reduced to about 20 volts D.C. by a resistor 48 in the line 36. Zener diode 49 stabilizes the maximum value of the D.C. voltage.

Transistor 38 is biased at its base just into cut-off by the network 9 that includes resistors 50 through 56 that are fed from the stabilized supply derived across a diode rectifier 58. When a fault of some predetermined magnitude occurs, a voltage is generated in the pickup coil 16 and is sufficient to turn on transistor 38. This biasing network 9 provides high sensitivity for the apparatus. When transistor 38 is conducting, a time delay capacitor 60 is charged until the capacitor voltage reaches some predetermined value, such as 15 volts, sufficient to breakdown the zener diode 42, and to turn on transistor 40. The time delay capacitor 60 is important in ensuring against false tripping since capacitor 60 requires a charging time inversely proportional to the magnitude of the fault current. The breakdown of diode 42 causes a rise in the voltage of the emitter of transistor 40 which is connected to the gate 45 of thyristor 44 with the cathode of element 44 connected to resistor 29 and then to the collector of transistor 40. When the voltage on the emitter of transistor 40 rises sufficiently, about 1 volt, it fires thyristor 44, energizing the trip coil and opening the circuit. This removes the AC supply to the tripped unit and to the load.

The circuit of FIG. 2 includes means for avoiding susceptibility to transients or noise in the form of zener diode 42 connected between transistors 38 and 40 and capacitors 62, 63 and 64. Capacitor 62 is connected between the base of transistor 38 and the line 36 on the low voltage side of voltage dropping resistor 48. Capacitor 63 is connected across the DC lines 36 and 37. Capacitor 64 is connected between the base of transistor 40 and the line 37.

The number of the several parallel resistors 53 through 56 may be selectively varied, or the magnitude of one or more changed, in a particular application in order to permit trimming of the trip level, or sensitivity, of the circuit.

Resistive element 52 is a thermistor that provides temperature compensation by modifying its conductivity in accordance with temperature in a manner to maintain the characteristics of the transistor 38 uniform with temperature. A pair of anti-parallel diodes 66 and 67 is connected across the sensing coil 16 to protect the transistor 38 from large voltages generated by the coil 16 under heavy fault conditions.

Additional elements of the circuit of FIG. 2 are the resistors 70, 71 and 72 connected respectively from the collector of transistor 38, the base of transistor 40, and the emitter of transistor 40, all to the line 37; capacitor 74 connected between the gate of thyristor 45 and line 37; and diode rectifier 76 connected from the cathode of thyristor 44 to line 37.

An alternative circuit in accordance with this invention is shown in FIG. 3. Similar to FIG. 2, the AC supplying the trip coil 21 and the sensing circuit is rectified by diodes 31 through 34 in bridge 30 to establish a DC level on the DC lines 36 and 37 which can be dropped by resistor 48 and stabilized by zener diode 49. Also, as in FIG. 2, a capacitor 46 and resistor 47 across lines 36 and 37 smooth out the DC voltage and the capacitor 46 also protects thyristor 44 against supply transients.

In FIG. 3, however, the output of the pickup coil 16 on the differential transformer is connected into the two sides of a differential amplifier formed by transistors 39 and 41, resistors 80 to 84, and diodes 101 and 102.

The differential amplifier is biased and partially temperature compensated by resistors 85 and 86 and diodes 87 to 90 to provide a predetermined level of collector voltage of, for example, about +7 volts. This maintains a normal voltage of about +7.6 volts at the junction point between a resistor 92 and the base of an additional transistor 43. The emitter of transistor 43 is held at 7 volts by the potential divider comprising resistors 93 and 94 and variable resistor 95. Hence, transistor 43 is normally off. The thyristor 44 is off when transistor 43 is off and the trip coil 21 is not energized.

When the voltage from the sensing coil 16 exceeds a preset level due to a fault condition, the voltage at the collectors of transistors 39 and 41 will fall to a level sufficient to turn on transistor 43 and fire thyristor 44. When thyristor 44 is energized, it allows current to flow through the trip coil 21 and diodes 32, 76 and 33 on the positive half-cycle and diodes 31, 76 and 34 on the negative half-cycle. This would trip the breaker and remove power from the load and the trip circuit.

An inverse time delay is introduced into the system by capacitor 96 connected between resistor 48 and the base of transistor 43. Resistor 98, capacitor 100 and diode 76 act to prevent the spurious switching of thyristor 44. Variable resistor 95 provides for minor adjustment in trip level.

The circuit of FIG. 4 is a simplified, and less preferred, version of the circuit of FIG. 2. A single diode rectifier 108 provides a DC voltage level on lines 36 and 37 which is stepped down by resistor 48 in line 36. A number of the elements of FIG. 4 correspond to like numbered elements of FIG. 2. Transistor 110 performs the functions of both the transistors 38 and 40 of FIG. 2. Transistor 110 is biased below cut-off by the resistors 111 through 116, which can be used to adjust the tripping sensitivity. When transistor 110 is turned on by a sufficient sensed voltage, the thyristor 44 is fired directly.

While the circuit of FIG. 4 is generally effective, it does not contain features of temperature compensation and noise immunity comparable with those of the circuit of FIG. 2.

It is thus seen that by a variety of solid state means, generally incorporating a thyristor as the basic firing element controlled by one or more transistors biased just into cut-off, there can be provided a relatively simple miniaturizable circuit with high input impedance, noise immunity, inverse time delay and temperature compensation as in the circuit of FIG. 2. The circuit of FIG. 3 further permits the generation of the trip signal a half-cycle sooner because both cycles of the sensed voltage are used. The circuit of FIG. 4 represents a low cost approach which is not preferred, but is presented as further illustration of the general concepts employed.

Apparatus employing a combination of the features herein presented, including the coaxial cable arrangement of conductors through the toroid of the differential transformer, the miniaturization of differential transformer in terms of size relative to the power conductors, and the sensing and tripping circuit as proposed permits the assemblage of a miniaturized ground fault interrupter of relatively low cost which provides performance, economy and size advantages over those known in the prior art.

Figure 5:
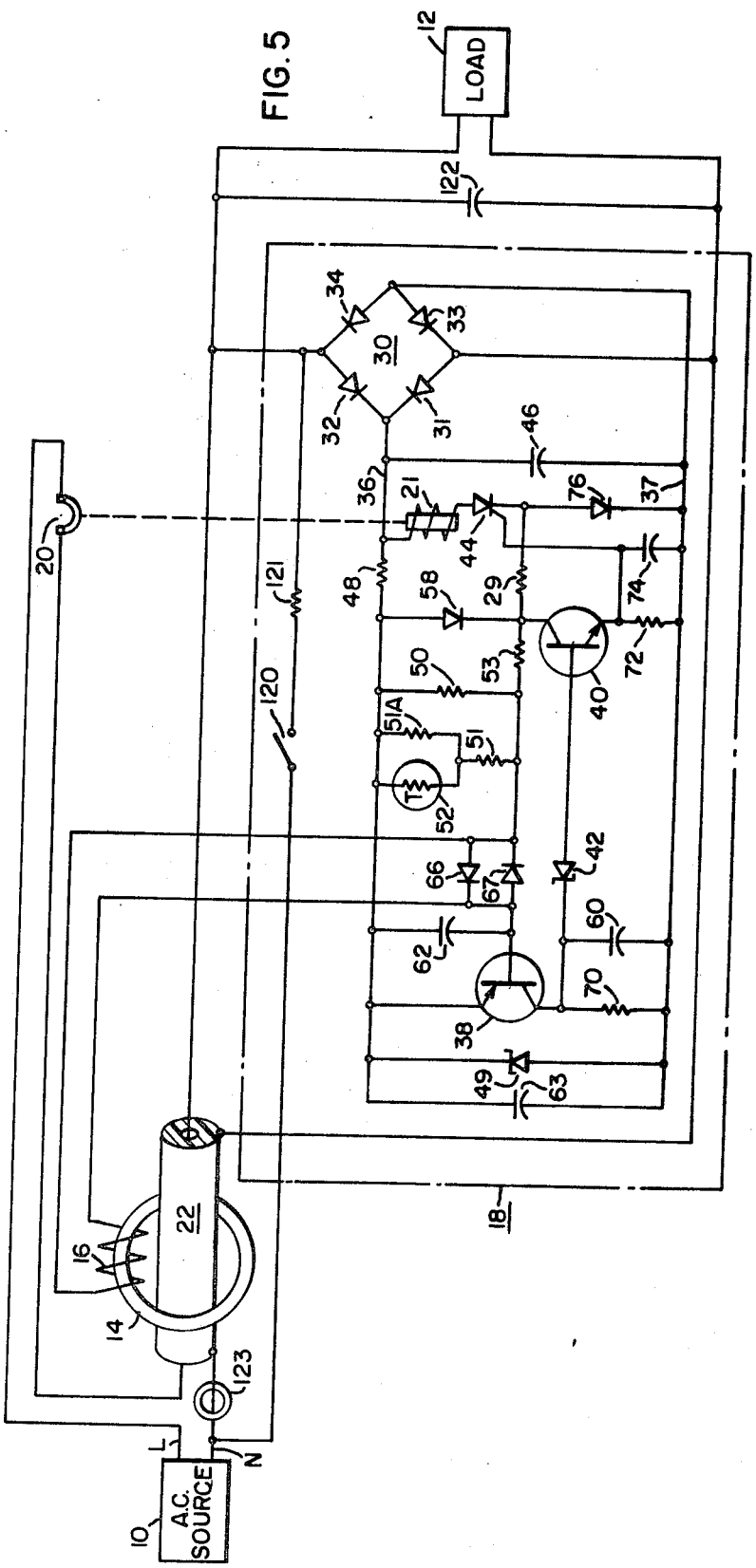
FIG. 5 is a circuit schematic of a complete ground fault interrupter in accordance with a preferred form of the invention.

FIG. 5 illustrates a schematic diagram of a ground fault circuit interrupter that includes features in accordance with the present invention. Trip circuit 18 of FIG. 5 is a modified form of the circuit of FIG. 2 and, where appropriate, like reference numerals identify corresponding elements. The apparatus of FIG. 5 has been constructed and successfully operated through rigorous testing.

Features of the trip circuit 18 of FIG. 5 that differ from the circuit of FIG. 2 will be mentioned. Trip coil 21 of circuit breaker 20 is located in a circuit branch between conductors 36 and 37 directly in series with the thyristor 44. Capacitor 46 is used without a series resistor 47, shown in FIG. 2. Resistor 53 is a single resistor (for the functions of the resistors 53–56 of FIG. 2) that was selected from several different values to set different sensitivity levels on the apparatus. Thermistor 52 has across it a new resistor 51A. Resistor 71 and capacitor 64 of FIG. 2 are not used as they were found unnecessary for noise suppression in the apparatus of interest. There is also provided a test switch 120 and resistor 121 between the L and N lines.

Additional elements shown in FIG. 5 include capacitor 122 between L and N on the load side and a saturable toroid 123 on the neutral conductor on the supply side which cooperate to avoid the problems of a grounded condition on the neutral conductor on the load side as disclosed in copending application, Ser. No. 158,337, filed June 30, 1971, by K. Coley et al. and assigned to the present assignee.

The apparatus of FIG. 5 has been constructed in a compact form using components identified below. The operation of this apparatus has been quite satisfactory within the requirements set forth in the presently proposed standards as set forth in Subject 943, Report of Meeting on Ground-Fault Circuit Interrupters, dated June 12, 1970 (corrections dated June 16, 1970) distributed to the industry by Underwriters' Laboratories, Inc., Melville, N.Y.

The following are components used in the apparatus of FIG. 5 and presented by way of further example:

| Component | Value |
|---|---|
| Transistor 38 | 2N2907A |
| Transistor 40 | 2N2222A |
| Thyristor 44 | ID604 (Unitrale Inc.) |
| Diodes 31-34, 58, 66, 67 & 76 | 1N5397 |
| Resistor 70 | 120 K. ohms |
| Resistor 72 | 3.9 K. ohms |
| Resistor 29 | 18 K. ohms |
| Resistor 53 | Variously selected: 570, 530, 400, 470, 50 or 120 ohms |
| Resistor 50 | 5.1 K. ohms |
| Resistor 51 | 3.0 K. ohms |
| Resistor 52 | |

| | |
|---|---|
| (N.T.C. Thermistor) | 3.0 K. ohms |
| Resistor 51A | 3.9 K. ohms |
| Resistor 121 | 18 K. ohms |
| Resistor 48 | 75 K. ohms |
| (All resistors were rated at ½ watt, plus or minus 5%). | |
| Zener diode 42 | 12 volt breakdown voltage |
| Zener diode 49 | 24 volt breakdown voltage |
| Capacitor 63 | 0.8 microf., 50v. |
| Capacitor 60 | 0.46 microf., 50v. |
| Capacitors 62 and 74 | 0.1 microf., 50v. |
| Capacitor 46 | 0.1 microf., 200v. |
| Capacitor 122 | 3.0 microf., 200v. |
| Toroids 14 and 123 | Supermalloy alloy (Arnold Eng. Co. No. 4T6180–54–AA) |
| Sense Winding 16 | 600 turns continuously would around the complete circumference of toroid 14. |

We claim:

1. A ground fault interrupter of the differential transformer type comprising: a toroidal magnet core having a center aperture; at least two primary conductors and means connecting said primary conductors between an alternating current source and a load, said at least two primary conductors extending through said aperture in said core and comprising only a single turn on said core, said at least two primary conductors being coaxial at least over the length thereof in said aperture; a secondary winding around said core; trip circuit means connected with said secondary winding for developing an electrical actuating signal only upon occurrence of a ground fault of a predetermined magnitude; and circuit breaker means connected to be responsive to said actuating signal from said trip circuit to open the current path through at least one of said primary conductors.

2. The subject matter of claim 1 wherein: said trip circuit comprises a solid state switching device having a pair of terminals connected to cause actuation of said circuit breaker means when a highly conductive current path exists between said main terminals, said solid state switching device also having a control terminal, at least a first solid state amplifying device resistively biased to a point just into its cut-off characteristic and having supplied thereto a signal from said secondary winding to supply a firing signal to the control terminal of said switching device only upon occurrence of a predetermined signal from said secondary winding.

3. The subject matter of claim 2 wherein: said trip circuit comprises a rectifier means to rectify AC line voltage; said first solid state amplifying device has resistive bias means including a temperature compensated resistive element; a second solid state amplifying device is connected to receive the output of said first solid state amplifying device only upon a predetermined time delay inversely related to the magnitude of said output, the output of said second solid state amplifying device being connected to said control terminal of said solid state switching device.

4. The subject matter of claim 3 wherein: said solid state switching device is a thyristor and said first and second solid state amplifying devices are transistors.

* * * * *